March 26, 1929.  H. A. PUTTEMANS ET AL  1,707,094
ADDING MACHINE
Filed Dec. 21, 1922  5 Sheets-Sheet 1
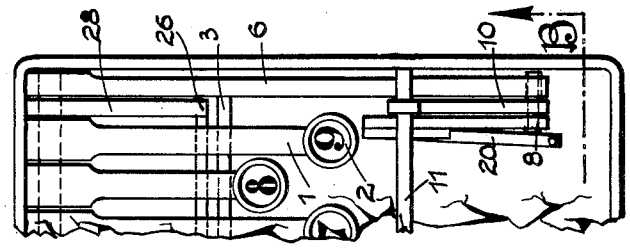
Fig. 1.
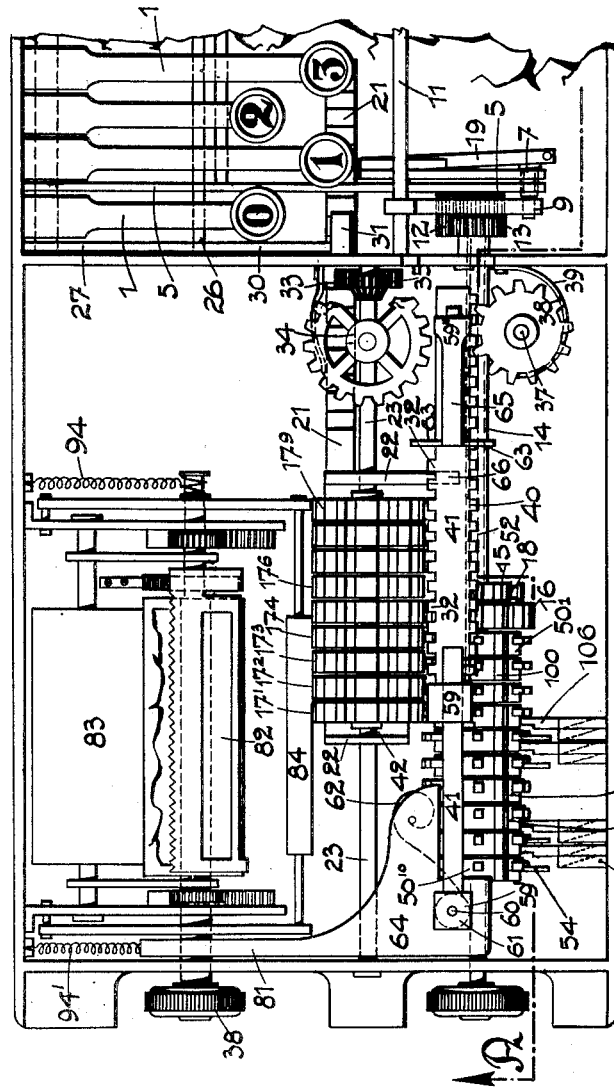
Fig. 23.
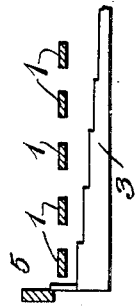
INVENTORS
HUBERT AUGUSTE PUTTEMANS
GEORGES VICTOR LAMBERT PERPETE
ATTORNEY March 26, 1929.   H. A. PUTTEMANS ET AL   1,707,094
ADDING MACHINE
Filed Dec. 21, 1922   5 Sheets-Sheet 2
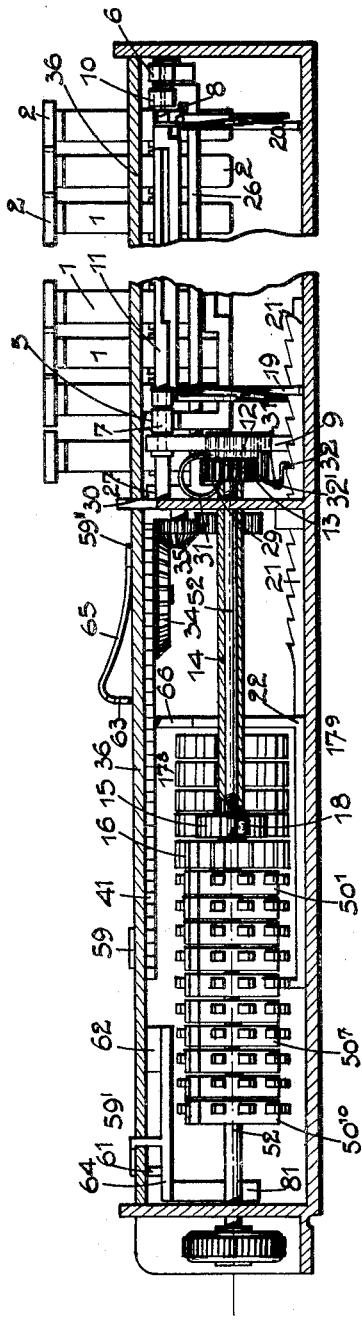
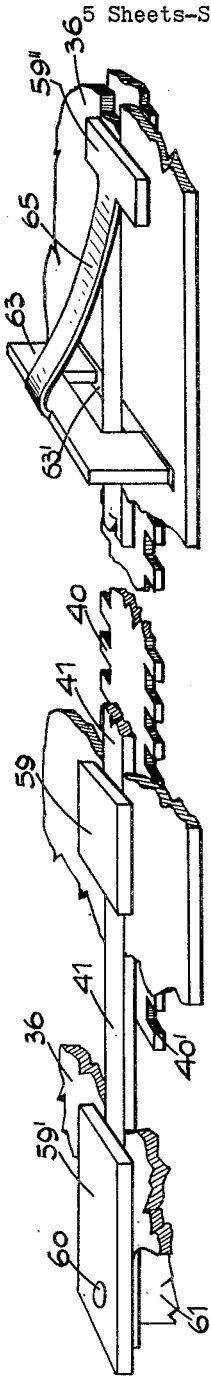
Fig. 2.
Fig. 5.
INVENTORS
HUBERT AUGUSTE PUTTEMANS
GEORGES VICTOR LAMBERT PERPÈTE
ATTORNEY

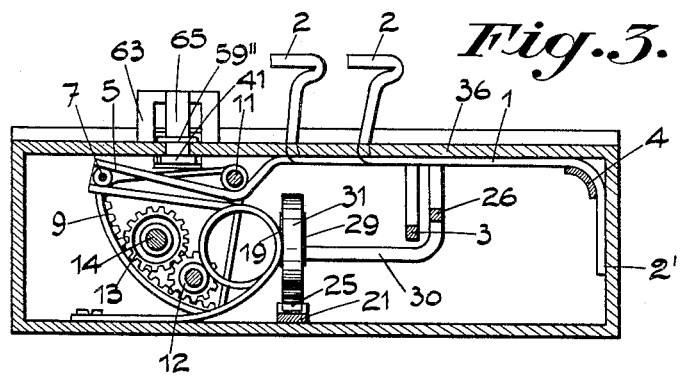
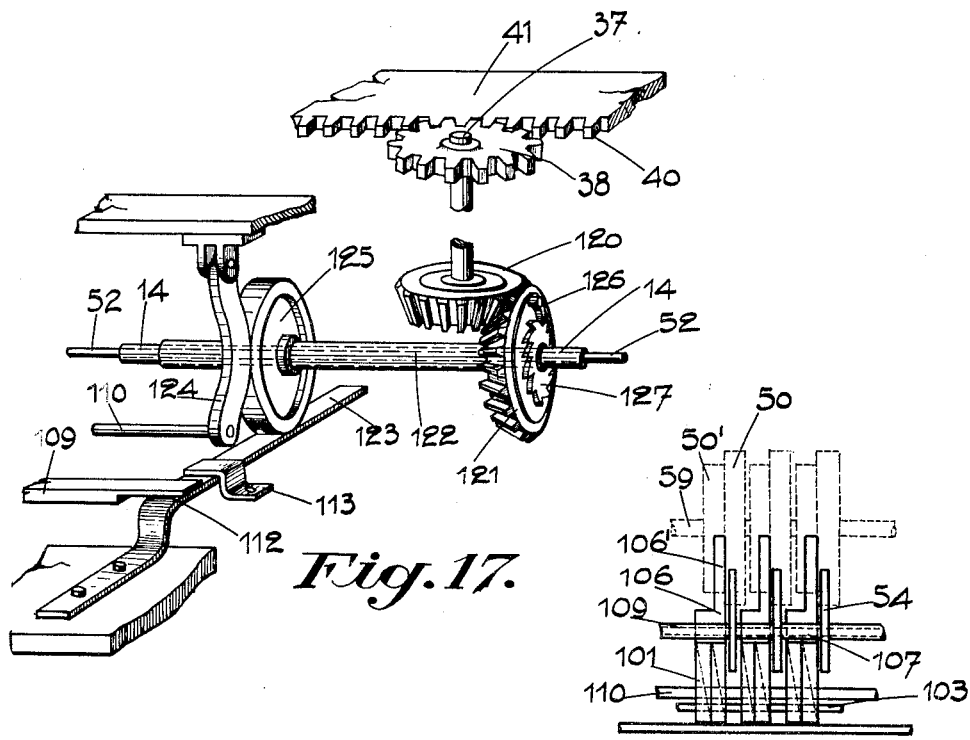

March 26, 1929.   H. A. PUTTEMANS ET AL   1,707,094
ADDING MACHINE
Filed Dec. 21, 1922    5 Sheets-Sheet 4
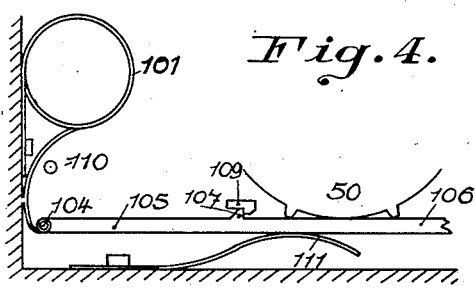
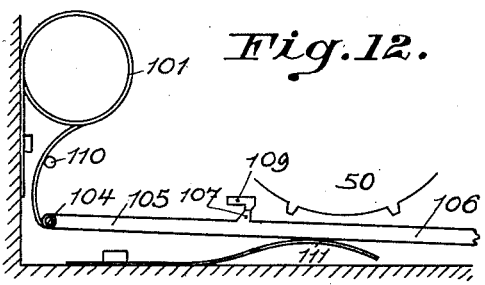
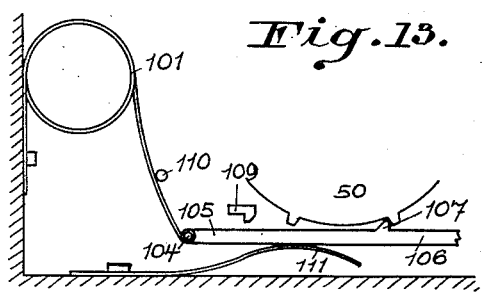
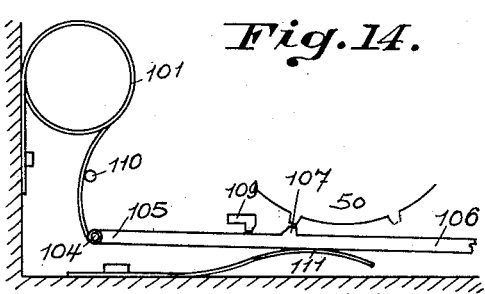
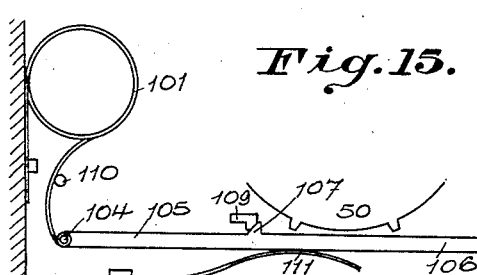
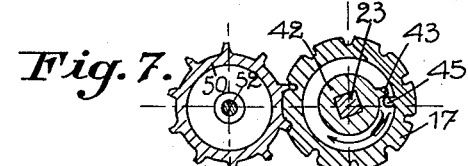
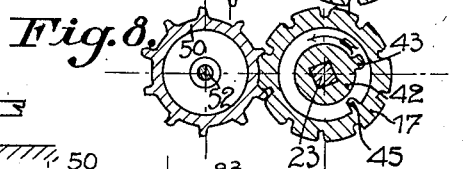
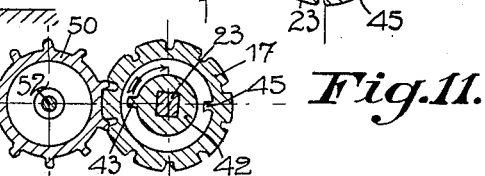
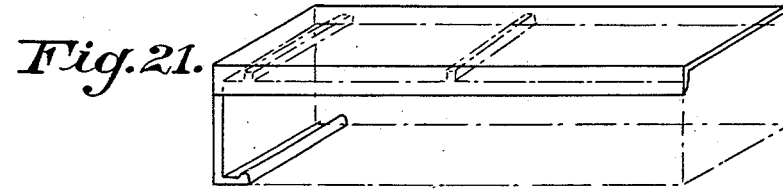
INVENTORS
HUBERT AUGUSTE PUTTEMANS
GEORGES VICTOR LAMBERT PERPÈTE
ATTORNEY March 26, 1929. H. A. PUTTEMANS ET AL 1,707,094
ADDING MACHINE
Filed Dec. 21, 1922  5 Sheets-Sheet 5

INVENTORS
HUBERT AUGUSTE PUTTEMANS.
GEORGES VICTOR LAMBERT PERPÈTE
ATTORNEY.

Patented Mar. 26, 1929.

1,707,094

UNITED STATES PATENT OFFICE.

HUBERT AUGUSTE PUTTEMANS AND GEORGES VICTOR LAMBERT PERPÈTE, OF BRUSSELS, BELGIUM.

ADDING MACHINE.

Application filed December 21, 1922, Serial No. 608,299, and in Belgium January 5, 1922.

This invention relates to adding machines, and more particularly to that type of machines comprising a ten keys keyboard, whose keys actuate by means of convenient means, a series of item wheels which in turn come into engagement with totalizing wheels or drums, a suitable printing device being provided for the purpose of printing upon a sheet of paper the various numbers set up on the item wheels.

The principal object of the invention is to provide an adding machine whereby, after a number has been set up, the operations of the various parts, which must be performed in order to bring the machine in such position as to allow the setting up of a further number, are performed by a very simple device, which is moved longitudinally by the thumb of the operator, or by a special key, or by any other convenient means. With this object in view, the invention consists in providing such a device which is very compact in construction, and which permits the machine being highly simplified in construction and being of very small and flat shape.

Said device consists in a slide or carriage like member, adapted to be moved in the direction of the longitudinal axis of the machine and the axial movement of which causes the recording and item printing wheels to be turned back to their zero positions and brought back to their initial positions in axial direction, said carriage or slide should a printing device be provided, also actuating the latter at the beginning of its stroke. The return of backward movement of this slide or carriage will be effected, as soon as it is released, automatically by means of a suitable spring. During the return or backward movement of the slide, the transfer mechanism will be actuated.

Another object of this invention is to provide very simple connecting means between the keys and the item wheels.

Other features are also included in this invention and will appear from the following description, and from the accompanying drawings, which make part of the invention.

The accompanying diagrams represent:

Fig. 1 is a horizontal plan view of the machine taken as a whole, with its lid and the horizontal partition provided in the upper part of the casing removed, and the transfer mechanism omitted.

Fig. 2 is a longitudinal sectional view on the zigzag line A—B in Fig. 1.

Fig. 3 is a transverse section of the machine on the line C—D in Fig. 1.

Fig. 4 is a partially transverse section on the line M—N in Fig. 1.

Fig. 5 is a perspective view, on an amplified scale, of the principal organ of the machine.

Figs. 7 to 11 are diagrams representing diverse relative positions of the item wheels and the totalizing wheels.

Figs. 12 to 15 are sectional views, corresponding to Fig. 4, showing the parts of the transfer mechanism in various positions.

Fig. 16 is a plan view of the transfer mechanism.

Fig. 17 is a perspective view of the means for actuating the transfer mechanism.

Fig. 21 is a perspective view of the lid of the machine.

Figure 23 is a view in elevation of the cross rod, the keys being shown in section.

Figure 9:
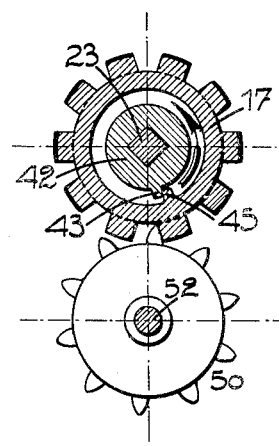
Figure 20:
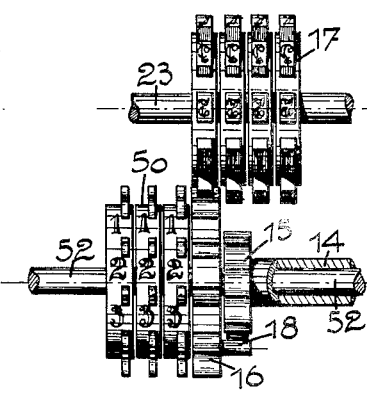
Figs. 20 and 22 show other details of said setting up mechanism.
Figure 22:
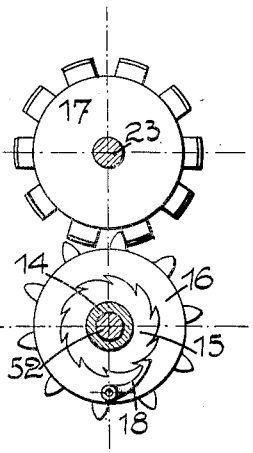
Figure 18:
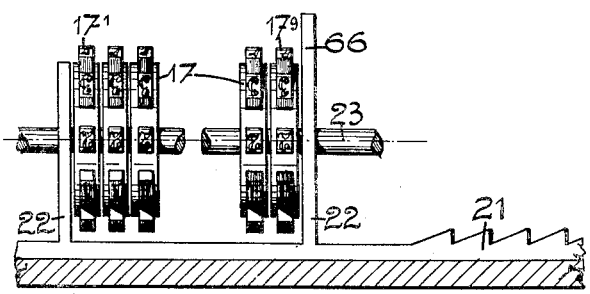
Figs. 18 and 19 show a detail of the setting up mechanism.
Figure 19:
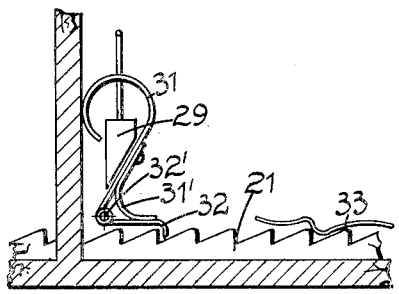
Figure 6:
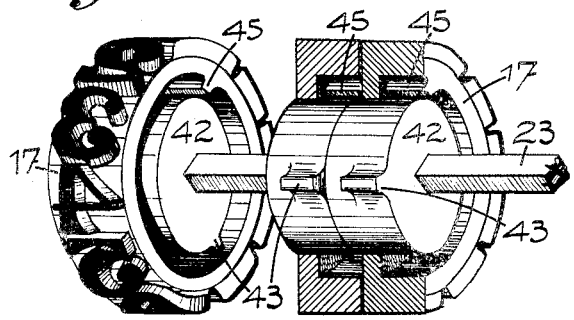
Fig. 6 is a perspective view, partly broken, of the item printing wheels.

The adding machine under this present application comprises these main sets of parts:

A keyboard provided with ten keys corresponding to the figures 0 to 9 which actuate, through a suitable contrivance, a drum 16 provided with ten teeth, in such a manner as to turn it an amount proportional to the figure marked upon the key which has been lowered.

This rotating movement is then transmitted to one of the recording and printing cylinders or drums $17^1$ to $17^9$ which are held close together by means of a sliding carriage 22 so as to be capable of travelling along a supporting shaft 23. Such shifting is necessary in order that every drum in succession may come in its turn in front of the toothed drum 16; the drum $17^1$ corresponds to the first figure (from the left) of the number to be recorded, the second drum $17^2$ corresponding to the second figure from the left, and so on.

On several keys being successively lowered, a number of drums 17 equal to the number of figures to be printed will be operated.

The number thus recorded will then be printed, through the action of a suitable mechanism, upon a paper ribbon placed close to the drums 17.

A totalizing mechanism has been arranged also in close proximity to these drums (lower corner of Fig. 1).

The longitudinal shifting of a slide 41 by the thumb of the operator's right hand will actuate the movement of the devices intended for printing, for bringing back to zero of the various totalizing drums and for effecting totalization of the numbers printed.

The keyboard comprises ten keys bearing the figures 0 to 9 and arranged in two rows of five keys each.

Each key is made of a steel blade so folded up (Fig. 3) as to constitute a head 2, a lever arm 1 and a spring 2'.

To that effect one end of every blade has been shaped circular in which is stamped its figure, the other end 2' being sufficiently resilient as to play the part of a spring. The ends 2' of all the keys are set one beside the other, and are held against the side partition of the casing by a rod 4 so shaped as to secure the necessary resiliency without any risk of breaking though acting at the same time as a support. The ceiling 36 also has the effect of fixing the key by holding the same against the rod 4.

A cross rod 3, extending under all the keys except the zero key is mounted on two arms 5 and 6 capable of oscillating around the axial rod 4 similarly to the key levers. Both arms 5 and 6 press with their ends upon the friction rollers of two fulcrum pins 7 and 8 fixed upon levers 10 which are fast on and integral with shaft 11 controlling the quadrant 9 this latter being toothed inside; one of these cranks is actually a spoke of that sector 9.

When lowered, the key levers will strike the cross rod 3 and drive it down the full extent of its stroke. The length of stroke is identical but the effect of the key lever movement varies with the step arrangement of rod 3, the said steps being so arranged that the various levers 1 will press against rod 3 at different distances from the ceiling 36 of the casing. They accordingly drive it along only a certain portion of their stroke which is proportional to the figure type marked on the key pressed down.

It is to be noticed that the rod 3 has only five steps instead of nine which would be supposed necessary to correspond to each one of the keys. Such simplification can be adopted owing to the fact that, in front of the cross rod 3, the amount of descent is not identical for all levers 1 in spite of every key head being lowered the same amount. As the key levers are of different lengths and the free end of each is depressed the same distance, it will be obvious that the longer lever will not operate the rod 3 to the same extent as the shorter lever. This fact has been taken advantage of and by calculating the distance between the keys the same step of rod 3 may be utilized for keys of different lengths, hence the necessity for only five steps in the rod 3.

Each time a key is struck, the toothed sector will therefore be turned a distance proportional to the figure marked upon the key pressed down. This sector 9 is in mesh with a gear 12 which is in engagement with a gear 13 as shown in Figs. 1 and 3. The gear 13 is fixed on a hollow shaft 14 which surrounds a supporting shaft 52. On shaft 14 is a toothed wheel 15 actuating, through ratchet 18, the drum 16 which is provided with ten teeth, and is loosely mounted upon the supporting shaft 52. The drum 16 will thus be operated in the movement of the hollow shaft 14 in one direction, through the cooperation of the ratchet 18 with the toothed wheel 15, the ratchet riding freely over the wheel in the opposite movement of the shaft 14 to avoid correspondingly operating the drum 16.

As to the raising of the sector and of all the parts forming the framework 5, 6, 3, this will be brought about by the action of two recoil springs 19 and 20 acting upon the fulcrum pins 7 and 8 provided with friction rollers.

Behind the adjusting drum 16 is a series of registering and item printing wheels $17^1$ to $17^9$, which are carried by the square section shaft 23 along which they can glide as hereinafter described in such a way that they may be brought successively into mesh with the toothed drum 16. They are held close to each other by means of a sliding carriage 22 leaning against the bottom of the casing, said carriage having a toothed formation 21 engaged by suitable means which will be hereafter described.

Each of the teeth of the wheels 17 has an embossed figure (say ten figures from 0 to 9 for every wheel).

Said wheels $17^1$ to $17^9$ are not mounted directly upon the shaft 23, but upon auxiliary shaft 42 surrounding the shaft 23, said shaft 42 extends only the length constituted by the thicknesses of all wheels put together. The shaft 42 will be capable of shifting together with the wheels along the supporting shaft 23 without any rotating movement either of the shaft or of the registering wheels taking place, since they are withheld by springs 44 fixed to the lower part of sliding carriage 22.

Catches 43 are arranged in a straight line along the hollow shaft 42 and are spaced apart with one catch for each wheel inside which it will be capable of moving. A sufficient space has been left between adjacent catches for the annular flanges 17' of the printing wheels 17.

The supporting shaft 23, which is here, by way of example, a square section one, will drag along in its rotation the hollow shaft 42, and consequently the catches 43.

On the other hand, each wheel is provided on the lower part of its rim with a catch 45 which, in the position corresponding to the zero, will engage with catch 43 but will disengage from it, whenever a figure will have been set up, and move an angular distance of an amount proportional to the value of the said figure.

All these catches must therefore be brought again to their initial position in order to have a further number set up, and this will be obtained by means of turning in the reverse direction all the catches of the secondary shaft 42.

To effect the setting up of all figures one after the other the wheels 17 must be successively thrown into gear with the driving drum 16 as soon as the key lowered for a foregoing figure is again raised. To obtain this the said wheel will be caused to travel along shaft 23 when the drum 16 will stop revolving, that is, to say, when the setting up of the figure is wholly effected. This takes place when the key has been entirely lowered, the desired result being obtained by the action of the contrivance mentioned hereafter.

The wheels 17 are moved to the left along shaft 23 by means of the sliding carriage 22 the bottom of which is provided with a rod 21 which presses it to the left by the action of a pawl 32 which cooperates with a ratchet tooth formation on the end of said rod 21 which slides along the bottom of the casing.

The drive of pawl 32 is obtained by the following arrangement:

A cross bar 26 extending under all the lever arms of the keys including the 0 one, is fixed to arms 27 and 28 oscillating round axial rod 4 similarly to the key levers 1.

The frame 26—27—28 so constituted actuates a wedge shaped tooth 29 provided at the end of rod 30.

The pawl 32 is pivotally connected at 32' to a spring blade 31 which is secured to the middle wall of the casing, as shown in Figure 1.

When the rod 26 is lowered, the tooth 29 is forced between the middle wall of the casing and the free end of spring 31, whereby the pawl 32 moves to the right until through the backward pressure of the spring $31^1$, it is thrown into engagement with the next tooth of the toothed formation 21.

When the key is again raised, the tooth 29 sets the spring 31 free, and the pawl 32 is brought back to the left, owing to the spring 31 resuming its initial position. The toothed rack 21 and the sliding carriage 22 are thus moved one tooth to the left, i. e. a distance equal to the pitch of the rack which corresponds to the thickness of a wheel 17. A spring 33 pressing against the rack 21 prevents this latter from being driven to the right by the friction exerted by the pawl 32 during its movement to the right.

50 are totalizing wheels, which are loosely mounted on the solid shaft 52 located in the hollow shaft 14, but independent from it. They are provided between their teeth with numerals which serve to enable reading of the total. Springs 54 are provided to act on said wheels 50 and hold them in every given position in such a way that the wheels 50 will be capable of being rotated in both directions. Said wheels are in such a position that the recording wheels 17 move toward the left beyond the adjusting drum 16, will be brought into mesh therewith. Owing to the fact that, when coming back to the zero position, every one of the wheels 17 is rotated, in a reverse direction, by a number of teeth equal to that by which they had been moved away from the zero at the moment of printing, these wheels will impart to the totalizing wheels geared with them, the same amount of displacement so as to have them turned an equal number of teeth. The figures being added to those already marked upon the wheels 50, the new total will be registered and visible through a sight aperture arranged in the ceiling of the casing.

Printing device arranged at the rear of the wheels 17 serves to print the number set up on said wheels upon a strip of paper. Said printing device may be of any well known type and may comprise a printing ribbon or an inking roller 84. It comprises a paper feeding shaft 82 and a paper store spool 83. The whole printing device is arranged in a frame urged by springs 94 and 94', said frame being connected by means of a rod 81 and a member 64 to a yielding finger-shaped member 62.

The slide or carriage 41 forming the main feature of the invention is essentially formed of a flat rack-bar 41', having a toothing 40' on its outer rim and a toothing 40 on its inner rim. The latter which extends only over a portion of the length of the slide or carriage 41 causes a toothed wheel 34 to rotate as the slide or carriage is moved towards the right, said wheel driving the gear wheels 35 of the shaft 23.

On the contrary, the outer teeth 40' on the slide or carriage 41 meshes on the entire length of the latter with a toothed wheel 38 which is mounted on an axle 37 and urged by a spring 39, one end of which is secured to the wall of the casing, whilst the other end thereof is attached to the axle 37.

The rack bar 41' has a flat bar 41 on its upper side, said bar 41 being guided in a longitudinal slot provided in the ceiling 36 of the casing. Brackets or plates 59, 59', 59'', extending through the ceiling 36 of the casing hold the bar 41 firmly against said ceiling. In the plate 59' arranged at the rear end of the bar 41 of the slide or carriage is secured a pin 60 projecting inwardly and carrying a rotatable roller 61. Attached to the front bracket or plate 59″ is a spring blade 65 the free end of which carries a stop 63 adapted to be moved through a slot 63′ into the interior of the machine on the closing of the cover to lock the parts against movement.

One of the teeth arranged on each wheel 50 is enlarged to form a zero tooth 100 (Fig. 1), said tooth, after a complete revolution of the wheel 50 will press against the end 106′ of rods 106 so that the latter will be pressed downwardly against the action of the spring 111, whereby a tooth 107 arranged on the back of each rod 106 will be released from its retaining bar 109, which is hook shaped in cross section, so that the rod 106 may be moved towards the wheel 50 by the action of a spring 101, pivotally connected to the rear end of said rod for the purpose of causing the tooth 107 thereof to rotate the adjacent wheel 50 on the left side of the releasing wheel to one tooth and thus effecting the bringing forward of units to the next higher units of the number.

As will be understood from the above description the actuation of the rods 106 depends on the spring 101.

The latter will be released and again tensioned at the proper time by a cross bar 110. To this purpose or object said cross bar 110 is suspended with both ends from swinging arms 124 which are actuated by a cam disc 125, mounted together with a bevel gear wheel 127 on a sleeve 122 surrounding the hollow shaft 114. Said bevel gear wheel 127 is actuated through the intermediate of a pawl 126 by a bevel gear 121 which meshes with a gear wheel 120 secured on the shaft 37 and rotated by the toothed wheel 38 above referred to.

The cam disc 125 not only actuates the swinging arms 124 but it also acts on the end 123 of one of the spring blades 112, on which the hook-shaped stop bar 109 is arranged, so that the latter will be lowered at the proper time for the purpose of facilitating the release of the tooth 107 on each rod 106, whereupon the spring blade 112 will return to its position determined by the lug 113.

The operation of the described transfer mechanism is as follows:

In their normal position, the rods 106 are retained against right displacement by the teeth 107 being engaged in the hook of transversal rod 109. In said position, the rod 110 does not contact with the springs 101, as shown in Figure 4.

When a totalizing wheel 50 completes a revolution, the large tooth 100 of said wheel presses the corresponding rod 106 downwards out of engagement with the rod 109, (Fig. 12). This permits the correspondent of spring 101 to move towards the right till it comes against the rod 110, this movement of the spring 101 being of such extent as to bring the tooth 107 of the considered rod 110 under the rod 109 in the position shown in Fig. 12.

When the cam disc 125 rotates, it frees the spring 101, as explained above, and the rod 106 is moved by said spring towards the right to such an extent that the tooth 107 comes into engagement with a tooth of the next higher wheel 50 and imparts to said wheel a rotation of a tenth of a revolution (see Fig. 13). In the position of said Fig. 13, the backward movement of the rod 106 is not possible, because its tooth 107 would come into contact with a tooth of the wheel 50, and impart to said wheel a rotation in direction opposite to that of its rotation during the movement of the rod 106 to the right. In order of permitting said return movement of the rod 106, the cam disc 125 presses the spring blade 123 downwardly, so that the rod 109 is lowered and takes with it the rod 106, whose tooth 107 can move under the teeth of the wheel 50 during the return movement of the spring 101 which is tensioned through rod 110. Figs. 14 and 15 show the positions of the parts during the movement to the left of rod 106. After the tooth 107 has left the teeth of the wheel 50, the rod 109 is raised to its normal position and owing to the inclined faces of said rod 109 and of the tooth 107, the latter can pass under the rod 109 and reassume its position shown on Fig. 4.

The operation of the machine is as follows:

After the number corresponding to the depression of keys has been adjusted on the wheels $17^1$—$17^9$ by means of the adjusting drum 16, the slide or carriage 41 will be actuated, preferably by means of the thumb of the right hand in such a way that it will be moved to the right by pressure against the part 63. During this movement the roller 61 at the rear end of the slide or carriage 41 will roll upon the yielding finger 62, whereby the frame of the printing device connected to said finger by means of the parts 64, 81 will be moved towards the types set up on the wheels $17^1$—$17^9$. The printing device will preferably act in such a way that first the inking roller 84 will ink the types on the wheels $17^1$—$17^9$, whereupon the types will be printed on the strip of paper fed to the roller 82.

After the types have been printed, the roller 61 ceases to act on the part 62 and the printing device will be drawn back to its inoperative position by the action of the springs 94 and 94′.

In the subsequent movement of the slide or carriage 41 towards the right, the inner toothing 40 thereof will be brought into mesh with the toothed wheel 34 which drives the axle 23 through the agency of the bevel gear wheels 35. The central shaft 42 will be rotated together with the axle 23, so that the projections 43 thereof will be pressed against the internally projecting fingers 45 of the wheels 17 irresponsive of the number on which said wheels have been rotated previously. In this way the wheels 17 will be turned back to their zero positions. In the backward rotation of the item wheels 27, the totalizing wheels 50, which are in mesh with the wheels 17, will be simultaneously rotated in opposite direction with relation to said item wheels, but to the equal angle which is necessary for the item wheels to attain their zero positions. In this way the number which has been set up previously on the item wheels, will now be brought forward to the totalizing wheels, said totalizing wheels being rotated about their axle 52 without the drum 16 taking part in such movement. The numerals marked between the teeth on the totalizing wheels permit to read the total sum obtained by each operation.

As soon as the bringing forward to the totalizing wheels has been completed, the roller 61 will engage an abutment 66 of the carriage 21 movably arranged on the bottom of the casing and wherein the item wheels 17 are held, so that in the subsequent movement of the slide or carriage 41 to the right said carriage 21 will be moved backwardly in axial direction together with all the item wheels 17 and internal shaft 42 until the item printing wheels will be placed in front of the adjusting drum 16.

After the completion of the backward movement of the wheels 17, the slide or carriage 41 will be brought to its end position towards the right; as soon as it will be released, the spring 39 attached to the axle 37 will drive the same automatically back to the left, the wheel 38 then meshing with the teeth 40' on the rack bar 41. In this backward movement of the slide or carriage the toothed wheel 34 will be rotated in opposite direction with relation to its previous movement, so that the projections 43 will be disengaged from the fingers 45 in order to release the item wheels 17 for another operation. At the same time the bevel gear wheels 120 and 127 will be driven by the toothed wheel 38, so that the cam disc 125 will first lower the spring blade 112 and next disengage the swinging arm 124. Therefore, those rods 106 which have been pressed downwardly by a zero tooth 100 may be pushed forwardly towards the totalizing wheels 50 by the springs 101, in order to transfer the the units forward to the wheels located immediately at the left of the releasing totalizing wheels. Shortly after the completion of this operation the cam disc 125 will again disengage the spring blade 112 so that the latter will return below its abutment 113 in order to receive again the arresting tooth 107 on the rod 106, whereupon the cross bar 110 secured to the swinging arms 124 will be moved backwardly, whereby the springs 101 will again be tensioned and held firmly in their inoperative positions.

As will be understood from the above, the slide or carriage 41 not only causes the item wheels to be moved backwardly in peripheral and axial direction, but it also actuates all the totalizing wheels which serve to receive the numbers set up on the item wheels and to bring the same forward, whereupon said members will again be brought back to their inoperative positions by the movement of the slide or carriage 41. Moreover by the movement of the slide or carriage the returning projection on the item wheels will be rotated backwardly and should a printing device be provided, the latter will be moved towards the item printing wheels.

By closing the box to put it into his pocket, the operator will secure the advantage of considerably reducing the thickness of the machine as a result of driving home the keys and other protruding parts: this is obtained by forcing the casing lid down upon keys and cursor, the end of said lid being so bent as to fit into a corresponding slot of the bottom (Fig. 2) and to act as a fulcrum. The operator can take off this lid and simply place it under the machine.

What we claim and desire to secure by Letters Patent is an adding machine characterized by any one or several of the following features:

1. In a recording and adding printing machine, a casing, a setting up mechanism, a resetting mechanism, a totalizing counter, a transfer mechanism, a slide longitudinally shiftable under the ceiling of the casing, a double rack carried by said slide, and means whereby said double rack actuates the resetting mechanism, the totalizing counter and the transfer mechanism.

2. In a recording and adding printing machine, a casing, printing types, a printing device movable towards the printing types for printing numbers on a film of paper, a frame carrying the printing device, an arm extending from said frame and carrying a resilient inclined plane, a slide shiftable under the ceiling of the machine, a roller at the end of said slide engaging the inclined plane at the beginning of the movement to the right of the slide, and springs attached at the end of the frame carrying the printing mechanism for bringing back said frame as soon as the said roller has left the inclined plane.

3. In combination, a series of keys carrying digits, a rocking lever, means whereby said lever is rocked according to the digit on the key used, an internally toothed sector on the shaft of said lever, a hollow shaft, a pinion on said shaft engaged by a second pinion meshing with the toothed sector, a solid shaft in said hollow shaft, a toothed drum loosely mounted on said solid shaft, means whereby the movement of the hollow shaft is imparted to said drum and a series of item toothed wheels successively engaged by said drum.

4. In combination a series of keys carrying digits, a rocking lever, means whereby said lever is rocked according to the digit on the key used, an internally toothed sector on the shaft of said lever, a hollow shaft parallel with the shaft of the rocking lever, a pinion on said hollow shaft engaged by a second pinion meshing with the toothed sector, a solid shaft loosely mounted in the hollow shaft, a toothed drum loosely mounted on said solid shaft, a toothed wheel on the end of the hollow shaft engaging said drum by means of a ratchet, and a series of item toothed wheels successively engaged by said drum.

5. In a recording and adding printing machine, a casing, a series of keys, a series of item wheels rotated in succession by the keys, a carriage maintained in a horizontal plane by which said wheels are held close to each other, a rack laterally projecting on the bottom of said carriage and having its teeth spaced apart a distance equal to the thickness of a wheel, a pawl held in engagement with said rack for moving laterally the carriage and the wheels as a whole, a spring on the end of which said pawl is pivoted, a universal bar lowered each time a key is used, a rod on said bar, a wedge shaped tooth at the end of said rod forced by the lowering of the universal bar between a wall of the casing and the spring for tensioning same and bring the pawl into engagement with the following tooth of the rack and disengaged by the lifting of the universal bar of releasing the spring and let it move the rack longitudinally.

6. In a recording and adding printing machine, a casing, a series of item wheels, a resetting mechanism for said wheels, a pinion on the end of the shaft of said resetting mechanism engaged by a second pinion integral with a bevel gear, a second horizontal bevel gear engaging the first bevel gear and the shaft of which carries a pinion, a slide longitudinally shiftable under the ceiling of the machine, and a rack carried by said slide and engaging the last mentioned pinion for actuating the resetting mechanism during the movement to the right of the slide.

7. A recording and adding printing machine, comprising a series of item wheels, and a series of totalizing wheels intended to be engaged by the item wheels when a number has been set up, a solid square shaft, a hollow shaft slidable along said solid shaft and on which are loosely mounted the item wheels, a catch on the internal periphery of each item wheel, a series of catches arranged on the same straight line along the hollow shaft and coacting with the catches of the item wheels during the rotation of the shaft, and means whereby a complete revolution is imparted to the solid shaft for resetting the item wheels and throw the number to be added into the totalizing mechanism.

8. In a recording and adding printing machine, a casing, a series of item wheels rotated in succession by independent keys, a carriage maintained in a horizontal plane by which said wheels are held close to each other, said carriage and said wheels being laterally shifted as a whole to an extent equal to the thickness of a wheel each time a key is used, a slide longitudinally shiftable under the ceiling of the machine, and means whereby said slide brings the carriage and the item wheels as a whole to their initial position after the wheels have been reset to zero position.

9. In a recording and adding printing machine, a casing, a series of item wheels rotated in succession by independent keys, a carriage maintained in a horizontal plane by which said wheels are held close to each other, said carriage and said wheels being laterally shifted as a whole to an extent equal to the thickness of a wheel each time a key is used, a projection on an arm of said carriage, a slide longitudinally shiftable under the ceiling of the machine, and a roller on said slide engaging said projection of the carriage for bringing the carriage and the item wheels as a whole to their initial position after the wheels have been reset to zero position.

10. In a recording and adding printing machine, a casing, a series of item wheels rotated in succession by the keys of the machine, a printing mechanism intended to move towards the item wheels for printing numbers set up on a film of paper, a carriage maintained in a horizontal plane and by which the item wheels are held close to each other, said carriage and said wheels being longitudinally shifted as a whole to an extent equal to the thickness of a wheel each time a key is used, a slide longitudinally shiftable under the ceiling of the machine, and a roller at the end of said slide intended to move the printing mechanism against the item wheels and further to bring the carriage and the item wheels as a whole in their initial position.

11. In combination, a keyboard, a series of item wheels, each tooth of which carries a printing type on its outer periphery, a series of totalizing toothed wheels, said item wheels and said totalizing wheels being uniformly spaced apart laterally and said item wheels being located to one side of the totalizing wheel representing the lowest order, a toothed drum rotated by the successive keys to an extent corresponding to the digit on the key used and engaging in succession the item wheels, means to move the item wheels longitudinally to bring a number of item wheels equal to the order of number represented by said item wheels into operative relation respectively with an equal number of totalizing wheels, a resetting mechanism to restore the item wheels to their normal position, the rotatory portion of said restoring movement being imparted to the respective totalizing wheels.

12. In a recording and adding printing machine, a casing, a series of item wheels intended to be engaged by the item wheels when a number has been set up, a solid square shaft, a hollow shaft slidable along said solid shaft and on which are loosely mounted the item wheels, a catch on the internal periphery of each item wheel, a series of catches arranged on the same straight line along the hollow shaft and coacting with the catches of the item wheels during the rotation of the shaft, a slide longitudinally shiftable under the ceiling of the machine, and means whereby said slide imparts a complete rotation to the solid shaft during its movement to the right for resetting the item wheels and whereby said slide imparts a complete revolution in the reverse direction to said shaft to bring the catches of the hollow shaft in their initial position in respect to the catches of the item wheels.

13. In a recording and adding printing machine, a casing, a transfer mechanism for a totalizing mechanism, a slide longitudinally shiftable under the ceiling of the machine, and means whereby said slide actuates transfer mechanism during its return stroke.

14. In a recording and adding printing machine, a casing, a transfer mechanism for a totalizing mechanism, a slide longitudinally shiftable under the ceiling of the machine, a rack carried by said slide and engaging a pinion, a shaft for said pinion, and means connecting said shaft and the transfer mechanism during the return stroke of the slide.

15. A setting up mechanism comprising independent keys, a toothed drum, means whereby said drum is successively rotated by the operation of the keys to an extent according to the digit on the key used, and a series of setting up wheels laterally shiftable as a whole each time a key is used to an extent equal to the thickness of a wheel, the first wheel being normally in engagement with the said toothed drum.

In testimony whereof they have affixed their signatures.

HUBERT AUGUSTE PUTTEMANS.
GEORGES VICTOR LAMBERT PERPÈTE.